US012570020B2

(12) United States Patent
Brooks et al.

(10) Patent No.: US 12,570,020 B2
(45) Date of Patent: Mar. 10, 2026

(54) BLIND CUTTING MACHINE

(71) Applicant: Home Depot Product Authority, LLC, Atlanta, GA (US)

(72) Inventors: Kenneth Richard Brooks, Stevensville, MI (US); Joshua Louis Skalecki, Baroda, MI (US)

(73) Assignee: Home Depot Product Authority, LLC, Atlanta, GA (US)

(*) Notice: Subject to any disclaimer, the term of this patent is extended or adjusted under 35 U.S.C. 154(b) by 161 days.

(21) Appl. No.: 18/376,133

(22) Filed: Oct. 3, 2023

(65) Prior Publication Data

US 2024/0109219 A1 Apr. 4, 2024

Related U.S. Application Data

(60) Provisional application No. 63/412,790, filed on Oct. 3, 2022.

(51) Int. Cl.

| | |
|---|---|
| ***B26D 7/22*** | (2006.01) |
| ***B26D 7/00*** | (2006.01) |
| ***B26D 7/18*** | (2006.01) |
| ***E06B 9/28*** | (2006.01) |

(52) U.S. Cl.

CPC ................. *B26D 7/22* (2013.01); *B26D 7/18* (2013.01); *B26D 2007/0018* (2013.01); *E06B 9/28* (2013.01)

(58) Field of Classification Search

CPC . B26D 7/18; B26D 7/22; B26D 23/00; B26D 23/005

See application file for complete search history.

(56) References Cited

U.S. PATENT DOCUMENTS

| | | | |
|---|---|---|---|
| 41,367 | A | 1/1864 | Denison |
| 55,919 | A | 6/1866 | Simmons |
| 592,495 | A | 10/1897 | Oswald |
| 728,424 | A | 5/1903 | Steffee |

(Continued)

FOREIGN PATENT DOCUMENTS

| | | | |
|---|---|---|---|
| EP | 3067507 | B1 | 3/2019 |
| WO | 1992017676 | A1 | 10/1992 |

(Continued)

OTHER PUBLICATIONS

International Search Report and Written Opinion of international application No. PCT/US23/75811, dated Jan. 12, 2024, 14 pp.

*Primary Examiner* — Adam J Eiseman

*Assistant Examiner* — Richard D Crosby, Jr.

(74) *Attorney, Agent, or Firm* — Greenberg Traurig, LLP

(57) ABSTRACT

A blind cutting machine includes a cutting blade; a base disposed on a first side of the cutting blade; and a guide disposed on a second side of the cutting blade. The first side is opposite the second side. The guide is adjacent to the cutting blade. The guide is configured to direct cutoff material to a waste collection area. An assembly includes a first member that is rotatable. A second member is configured to limit an amount of rotation of the first member. An actuator is configured to move the second member to a location wherein the second member does not limit the amount of rotation of the first member. The first member is configured to prevent a hand of an operator from coming into contact with the cutting blade.

18 Claims, 7 Drawing Sheets

(56) References Cited

U.S. PATENT DOCUMENTS 794,060 A 7/1905 Uzel
863,601 A 8/1907 Gast
1,214,575 A 2/1917 Miller
1,964,984 A 7/1934 Gast
2,134,332 A 10/1938 Hubbard
2,431,482 A 11/1947 Hutchinson
2,644,520 A 7/1953 Nelson
2,888,048 A 5/1959 Gast, Jr.
2,929,419 A 3/1960 Johnson
3,121,359 A 2/1964 Anderson
3,269,239 A * 8/1966 Dixon ...................... A01G 2/35 144/217
3,281,914 A 11/1966 Hunter
3,299,754 A 1/1967 Steingass
3,391,591 A * 7/1968 Funke .................... B23D 31/00 83/198
3,452,632 A * 7/1969 Brolund ............... B23D 35/008 100/224
3,555,864 A 1/1971 Wegner
3,722,573 A 3/1973 Stark
3,760,664 A 9/1973 Gossling
3,772,762 A 11/1973 Stark
4,227,305 A 10/1980 Newman
4,545,100 A 10/1985 Gaillard
4,589,312 A 5/1986 Meyers
4,589,313 A 5/1986 Meyers
4,712,457 A 12/1987 Percivalle
4,790,226 A 12/1988 Tsuchida
4,807,363 A 2/1989 Clifton, Jr.
4,819,530 A 4/1989 Huang
4,907,325 A 3/1990 Hsu
4,993,131 A 2/1991 Graves
5,056,388 A 10/1991 Dekker
5,072,494 A 12/1991 Graves
5,103,702 A 4/1992 Yannazzone
5,106,702 A 4/1992 Walker
5,333,365 A 8/1994 Marocco
5,339,716 A 8/1994 Sands
5,456,149 A 10/1995 Elsenheimer
5,799,557 A 9/1998 Wang
5,806,394 A 9/1998 Marocco
5,816,126 A 10/1998 Pluber
5,826,317 A 10/1998 Van Oostrom
5,927,172 A 7/1999 Wang
6,003,217 A 12/1999 Graves
6,003,218 A 12/1999 Schumann
6,079,306 A 6/2000 Liu
6,089,134 A 7/2000 Marocco
6,167,789 B1 1/2001 Daniels
6,178,857 B1 1/2001 Marocco
6,196,099 B1 3/2001 Marocco
6,240,824 B1 6/2001 Hsu
6,314,851 B1 11/2001 Graves
6,334,379 B1 1/2002 Sudano
6,336,388 B1 1/2002 Marocco
6,412,381 B1 7/2002 Wang
6,427,571 B1 8/2002 Hsu
6,435,066 B1 8/2002 Kutchmarek
6,604,443 B2 8/2003 Roberts
6,615,698 B2 9/2003 Chuang
6,644,160 B1 11/2003 Boselli
6,681,673 B1 1/2004 Kutchmarek
6,688,204 B2 2/2004 Huang
6,742,423 B1 6/2004 Huang
6,745,659 B1 6/2004 Cunningham
6,758,120 B2 7/2004 Marocco
6,761,099 B2 7/2004 Lin
6,782,788 B1 8/2004 Kutchmarek
6,793,073 B2 9/2004 Tu
6,877,409 B2 4/2005 Huang
6,931,970 B2 8/2005 Cheng
6,945,152 B2 9/2005 Jabbari
6,971,296 B2 12/2005 Lin
6,973,364 B2 12/2005 Schwartz
6,990,881 B2 1/2006 Lin
7,000,516 B2 2/2006 Lin
7,000,521 B1 2/2006 Cheng
7,007,576 B2 3/2006 Roberts
7,017,459 B2 3/2006 Marocco
7,024,977 B2 4/2006 Nien
7,036,412 B2 5/2006 Abdollahzadeh
7,040,205 B2 5/2006 Roberts
7,044,043 B2 5/2006 Cheng
7,059,230 B2 6/2006 Caputo
7,069,832 B2 7/2006 Roberts
7,069,833 B2 7/2006 Roberts
7,100,485 B2 9/2006 Roberts
7,104,175 B2 9/2006 Roberts
7,107,889 B2 9/2006 Marocco
7,114,421 B2 10/2006 Marocco
7,118,028 B2 10/2006 Liu
7,124,672 B2 10/2006 Marocco
7,178,439 B2 2/2007 Gilboy
7,255,031 B2 8/2007 Nien
7,278,345 B2 10/2007 Schimmels
7,444,910 B2 11/2008 Marocco
RE40,605 E 12/2008 Kutchmarek
7,467,578 B2 12/2008 Marocco
7,506,567 B2 3/2009 Simokovic
7,600,549 B2 10/2009 Cheng
7,610,835 B2 11/2009 Marocco
7,644,509 B2 1/2010 Lee
7,681,480 B2 3/2010 Roberts
7,752,724 B2 7/2010 Kollman
7,806,030 B2 10/2010 Kollman
7,810,418 B2 10/2010 Potts
D632,710 S 2/2011 Brown
D633,115 S 2/2011 Brown
D633,116 S 2/2011 Brown
7,886,418 B2 2/2011 Birch
D636,415 S 4/2011 Brown
D636,416 S 4/2011 Brown
7,918,150 B2 4/2011 Marocco
7,984,666 B2 7/2011 Nien
7,987,754 B2 8/2011 Caputo
8,020,478 B2 9/2011 Cheng
8,065,861 B2 11/2011 Caputo
D655,322 S 3/2012 Brown
8,161,857 B2 4/2012 Roberts
8,171,832 B2 5/2012 Lee
8,256,333 B2 9/2012 Begin
8,261,644 B2 9/2012 Caputo
8,286,538 B2 10/2012 Roberts
8,322,260 B2 12/2012 Birch
8,499,670 B2 8/2013 Caputo
8,505,422 B2 8/2013 Kollman
8,505,425 B2 8/2013 Kollman
8,631,732 B1 1/2014 Birch
8,720,313 B2 5/2014 Kollman
8,739,666 B2 6/2014 Kollman
8,783,143 B2 7/2014 Kollman
8,839,701 B2 9/2014 Begin
8,839,703 B2 9/2014 Kollman
8,844,414 B2 9/2014 Georgi
9,016,177 B2 4/2015 Caputo
9,068,393 B2 6/2015 Lee
9,266,639 B2 2/2016 Cluett
9,333,660 B2 5/2016 Chen
9,427,813 B2 8/2016 Begin
9,440,368 B2 9/2016 Birch
9,463,576 B2 10/2016 Hsu
9,487,995 B2 11/2016 Georgi
9,586,332 B2 3/2017 Hsu
9,643,331 B2 5/2017 Hsu
9,649,774 B2 5/2017 Kollman
9,862,111 B2 1/2018 Hsu
9,903,156 B2 2/2018 Lee
10,166,687 B2 1/2019 Chen
10,183,413 B2 1/2019 Hsu
10,220,534 B2 * 3/2019 Chen .................... B26D 7/2614
10,239,221 B2 3/2019 Persson
RE47,416 E 6/2019 Lee
10,350,690 B2 7/2019 Hsu
10,391,659 B2 8/2019 Lee

(56) References Cited

U.S. PATENT DOCUMENTS

| | | | | |
|---|---|---|---|---|
| 10,450,129 | B2 | 10/2019 | Cluett | |
| 10,478,987 | B1 | 11/2019 | Lee | |
| 10,544,618 | B2 * | 1/2020 | Lee | E06B 9/266 |
| 10,639,729 | B2 | 5/2020 | Begin | |
| 10,786,921 | B2 | 9/2020 | Caputo | |
| 10,792,739 | B2 | 10/2020 | Potts | |
| 2002/0029674 | A1 | 3/2002 | Graves | |
| 2003/0033919 | A1 | 2/2003 | Lin | |
| 2003/0066403 | A1 | 4/2003 | Lin | |
| 2003/0140756 | A1 | 7/2003 | Lin | |
| 2003/0197085 | A1 | 10/2003 | Wilson | |
| 2004/0031366 | A1 | 2/2004 | Huang | |
| 2004/0065182 | A1 | 4/2004 | Lin | |
| 2004/0094005 | A1 | 5/2004 | Lin | |
| 2004/0103767 | A1 | 6/2004 | Lin | |
| 2004/0103771 | A1 | 6/2004 | Lin | |
| 2004/0173066 | A1 | 9/2004 | Abdollahzadeh | |
| 2004/0226422 | A1 | 11/2004 | Marocco | |
| 2005/0000330 | A1 | 1/2005 | Schimmels | |
| 2005/0000345 | A1 | 1/2005 | Schimmels | |
| 2005/0150344 | A1 | 7/2005 | Nien | |
| 2005/0166740 | A1 | 8/2005 | Marocco | |
| 2006/0065086 | A1 | 3/2006 | Swopes | |
| 2006/0123965 | A1 | 6/2006 | Cheng | |
| 2006/0150793 | A1 | 7/2006 | Marocco | |
| 2006/0179991 | A1 | 8/2006 | Nien | |
| 2006/0207399 | A1 | 9/2006 | Birch | |
| 2006/0266194 | A1 | 11/2006 | Huang | |
| 2007/0089583 | A1 | 4/2007 | Cheng | |
| 2007/0095179 | A1 | 5/2007 | Mccarty | |
| 2007/0107176 | A1 | 5/2007 | Colson | |
| 2007/0169601 | A1 | 7/2007 | Yu | |
| 2007/0246171 | A1 | 10/2007 | Cheng | |
| 2007/0277657 | A1 | 12/2007 | Hilgendorf | |
| 2008/0016997 | A1 | 1/2008 | Nien | |
| 2008/0135190 | A1 | 6/2008 | Cheng | |
| 2008/0282856 | A1 | 11/2008 | Antonini | |
| 2009/0019980 | A1 | 1/2009 | Hansen | |
| 2009/0064835 | A1 | 3/2009 | Nien | |
| 2009/0107313 | A1 | 4/2009 | Nien | |
| 2010/0089217 | A1 * | 4/2010 | Cheng | B23D 23/00 83/638 |
| 2010/0126323 | A1 | 5/2010 | Chen | |
| 2010/0170374 | A1 | 7/2010 | Galas | |
| 2010/0170375 | A1 | 7/2010 | Kollman | |
| 2010/0199824 | A1 | 8/2010 | Remmert | |
| 2010/0208059 | A1 | 8/2010 | Caputo | |
| 2011/0056353 | A1 | 3/2011 | Begin | |
| 2011/0088524 | A1 | 4/2011 | Potts | |
| 2012/0006168 | A1 | 1/2012 | Swopes | |
| 2012/0012484 | A1 | 1/2012 | Cluett | |
| 2012/0210840 | A1 | 8/2012 | Houle | |
| 2013/0074669 | A1 | 3/2013 | Swopes | |
| 2013/0276605 | A1 | 10/2013 | Kollman | |
| 2014/0360328 | A1 | 12/2014 | Georgi | |
| 2015/0197026 | A1 | 7/2015 | Caputo | |
| 2015/0197982 | A1 | 7/2015 | Lee | |
| 2015/0321367 | A1 | 11/2015 | Hsu | |
| 2017/0021436 | A1 | 1/2017 | Donahue | |
| 2018/0135352 | A1 * | 5/2018 | Lee | E06B 9/266 |
| 2019/0270213 | A1 | 9/2019 | Lee | |
| 2020/0039736 | A1 | 2/2020 | Cluett | |
| 2020/0406380 | A1 | 12/2020 | Liu | |
| 2021/0039273 | A1 | 2/2021 | Caputo | |

FOREIGN PATENT DOCUMENTS

| | | | |
|---|---|---|---|
| WO | 1997010407 | A1 | 3/1997 |
| WO | 2001007747 | A1 | 2/2001 |
| WO | 2002096586 | A1 | 12/2002 |
| WO | 2003010408 | A2 | 2/2003 |
| WO | 2003031105 | A1 | 4/2003 |
| WO | 2004078397 | A1 | 9/2004 |
| WO | 2005005085 | A1 | 1/2005 |
| WO | 2005031103 | A1 | 4/2005 |
| WO | 2005037500 | A1 | 4/2005 |
| WO | 2005099416 | A2 | 10/2005 |
| WO | 2006060395 | A2 | 6/2006 |
| WO | 2006072253 | A1 | 7/2006 |
| WO | 2007086933 | A1 | 8/2007 |
| WO | 2007140301 | A1 | 12/2007 |
| WO | 2009036248 | A2 | 3/2009 |
| WO | 2010006255 | A2 | 1/2010 |
| WO | 2011150248 | A2 | 12/2011 |
| WO | 2016032373 | A1 | 3/2016 |
| WO | 2019165509 | A1 | 9/2019 |

* cited by examiner

BLIND CUTTING MACHINE

RELATED APPLICATIONS

This application claims priority to U.S. Provisional Application No. 63/412,790, titled "LATCH MECHANISM FOR BLIND CUTTING MACHINE" and filed on Oct. 3, 2022, the entire contents of which are hereby incorporated by reference.

FIELD

The present disclosure relates to the field of blind cutting machines. More specifically, the present disclosure relates to safety mechanisms for blind cutting machines configured for trimming window blinds in a retail store including safety mechanisms for protecting an operator of the blind cutting machines and mechanisms for protecting a component of the blind cutting machine to ensure proper machine operation.

BACKGROUND

Window blinds come in a variety of different materials and sizes. The windows upon which the window blinds are being installed also come in a variety of sizes. As a result, window blinds can be cut to a particular length to be customized to fit a corresponding window.

SUMMARY

In some embodiments, an assembly includes a first member, wherein the first member is rotatable; a second member, wherein the second member is configured to limit an amount of rotation of the first member; and an actuator, wherein the actuator is configured to move the second member to a location wherein the second member does not limit the amount of rotation of the first member; wherein the assembly is configured to be installed in a cutting assembly of a blind cutting machine; wherein the first member is configured to prevent a hand of an operator from coming into contact with a cutting blade of the cutting assembly.

In some embodiments, the assembly includes a third member, wherein the third member is secured to the actuator, and wherein the second member is secured to the third member.

In some embodiments, the assembly includes a fourth member, wherein the fourth member is configured to limit the amount of rotation of the first member.

In some embodiments, the amount of rotation limited by the fourth member is greater than the amount of rotation limited by the second member.

In some embodiments, in a first state, the second member is configured to not limit the amount of rotation of the first member.

In some embodiments, a blind cutting machine includes a cutting blade; and an assembly, including: a first member, wherein the first member is rotatable; a second member, wherein the second member is configured to limit an amount of rotation of the first member; and an actuator, wherein the actuator is configured to move the second member to a location wherein the second member does not limit the amount of rotation of the first member; wherein the first member is configured to prevent a hand of an operator from coming into contact with the cutting blade.

In some embodiments, the assembly includes a third member, wherein the third member is secured to the actuator, and wherein the second member is secured to the third member.

In some embodiments, the assembly includes a fourth member, wherein the fourth member is configured to limit the amount of rotation of the first member.

In some embodiments, the amount of rotation limited by the fourth member is greater than the amount of rotation limited by the second member.

In some embodiments, in a first state, the second member is configured to not limit the amount of rotation of the first member.

In some embodiments, the blind cutting machine includes a display device.

In some embodiments, the blind cutting machine includes a housing, wherein the cutting blade and the assembly are disposed within an interior of the housing.

In some embodiments, the cutting blade is configured to cut window blinds of different types and sizes.

In some embodiments, the second member is configured to limit the amount of rotation of the first member for a window blind of a first type and configured to not limit the amount of rotation of the first member for a window blind of a second type, wherein the second type is different than the first type.

In some embodiments, a blind cutting machine includes a frame; a housing; and a cutting assembly disposed within the housing, wherein the cutting assembly includes: a cutting blade; and an assembly, including: a first member, wherein the first member is rotatable; a second member, wherein the second member is configured to limit an amount of rotation of the first member; and an actuator, wherein the actuator is configured to move the second member to a location wherein the second member does not limit the amount of rotation of the first member; wherein the first member is configured to prevent a hand of an operator from coming into contact with the cutting blade.

In some embodiments, the blind cutting machine includes a display device.

In some embodiments, the blind cutting machine includes a waste bin.

In some embodiments, in a first state, the second member is configured to not limit the amount of rotation of the first member.

In some embodiments, the cutting blade is configured to cut window blinds of different types and sizes.

In some embodiments, the second member is configured to limit the amount of rotation of the first member for a window blind of a first type and configured to not limit the amount of rotation of the first member for a window blind of a second type, wherein the second type is different than the first type.

In some embodiments, a blind cutting machine includes a cutting blade; a base disposed on a first side of the cutting blade; and a guide disposed on a second side of the cutting blade. In some embodiments, the first side is opposite the second side. In some embodiments, the guide is adjacent to the cutting blade. In some embodiments, the guide is configured to direct cutoff material to a waste collection area. In some embodiments, an assembly includes a first member. In some embodiments, the first member is rotatable. In some embodiments, the second member is configured to limit an amount of rotation of the first member. In some embodiments, an actuator is configured to move the second member to a location wherein the second member does not limit the amount of rotation of the first member. In some embodiments, the first member is configured to prevent a hand of an operator from coming into contact with the cutting blade.

In some embodiments, a blind cutting machine includes a frame; a housing; a cutting blade; a base disposed on a first side of the cutting blade; and a guide disposed on a second side of the cutting blade. In some embodiments, the first side is opposite the second side. In some embodiments, the guide is adjacent to the cutting blade. In some embodiments, the guide is configured to direct cutoff material to a waste collection area. In some embodiments, a cutting assembly is disposed within the housing. In some embodiments, the cutting assembly includes a cutting blade. In some embodiments, an assembly includes a first member. In some embodiments, the first member is rotatable. In some embodiments, a second member is configured to limit an amount of rotation of the first member. In some embodiments, an actuator is configured to move the second member to a location wherein the second member does not limit the amount of rotation of the first member. In some embodiments, the first member is configured to prevent a hand of an operator from coming into contact with the cutting blade.

In some embodiments, a blind cutting machine includes a cutting blade; a base disposed on a first side of the cutting blade; and a guide disposed on a second side of the cutting blade. In some embodiments, the first side is opposite the second side. In some embodiments, the guide is adjacent to the cutting blade. In some embodiments, the guide is configured to direct cutoff material to a waste collection area. In some embodiments, an assembly includes a first member. In some embodiments, the first member is rotatable. In some embodiments, the second member is configured to limit an amount of rotation of the first member. In some embodiments, the first member is configured to prevent a hand of an operator from coming into contact with the cutting blade.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

Like reference numbers represent the same or similar parts throughout.

DETAILED DESCRIPTION

Window blinds come in a variety of different materials and sizes. For example, window blinds can include cellular window blinds having a plurality of honeycomb cells, faux wood blinds, or roller shades. The windows upon which the window blinds are being installed also come in a variety of sizes. As a result, window blinds may need to be cut to a particular length to be customized to fit a corresponding window. Embodiments of this disclosure relate to a blind cutting machine that is configured to be located within a retail store so that window blinds can be customized to fit a customer's need within the store. In some embodiments, this can avoid a waiting process in which customer's otherwise order window blinds online and wait for them to be cut and shipped to the customer or a retail store for pickup. More specifically, embodiments of this disclosure relate to improved safety features for a blind cutting machine to protect an operator, individuals nearby the blind cutting machine, and components of the blind cutting machine when used to trim window blinds.

Figure 1:
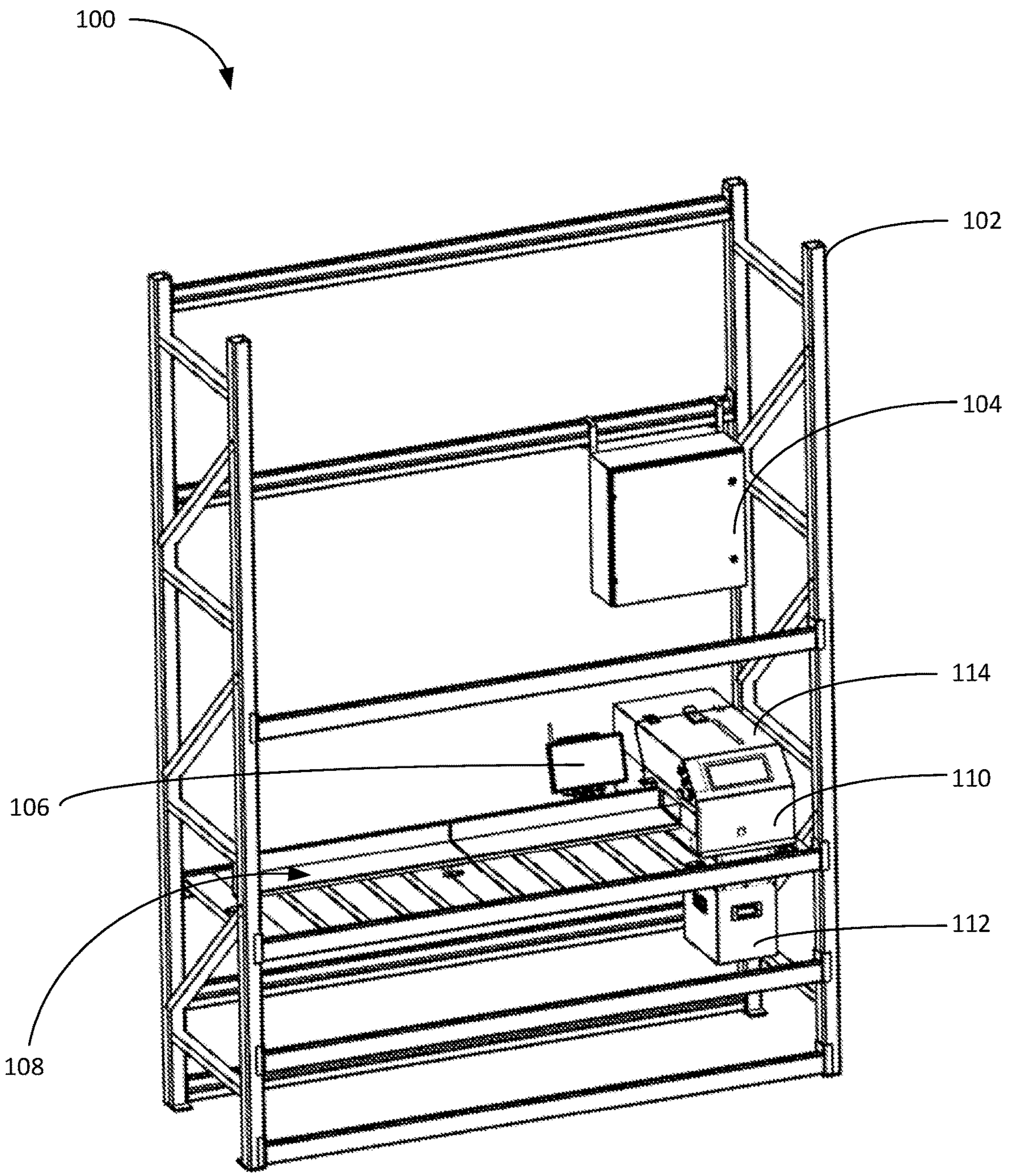
FIG. 1 shows a blind cutting machine, according to some embodiments.

FIG. 1 shows a blind cutting machine 100, according to some embodiments. The blind cutting machine 100 can include a support structure 102. In the illustrated embodiment, the support structure 102 is a frame. It is to be appreciated that the configuration of the support structure 102 can vary beyond the illustrated embodiment. The blind cutting machine 100 includes an electronics module 104, a display screen 106, a platform 108, a cutting assembly 110, and a waste bin 112. It is to be appreciated that the blind cutting machine 100 can include one or more additional components.

In some embodiments, the electronics module 104 can include various circuitry to connect the blind cutting machine 100 to a power source.

In some embodiments, the display screen 106 can provide a user interface for an operator to interact with the blind cutting machine 100 and provide for particular settings related to the blind material, length, combinations thereof, or the like.

In some embodiments, the platform 108 can receive a window blind to be cut.

In some embodiments, the cutting assembly 110 can include a housing 114 within which the cutting blade and other components are enclosed, protecting the operator from any interaction with the cutting blade itself. In some embodiments, the cutting assembly 110 can include one or more safety features such as, but not limited to, a gate and latch system (described in additional detail in accordance with FIGS. 2-4 below).

In some embodiments, the blind cutting machine 100 includes a waste bin 112 for collecting waste from the cutting process.

Figure 2:
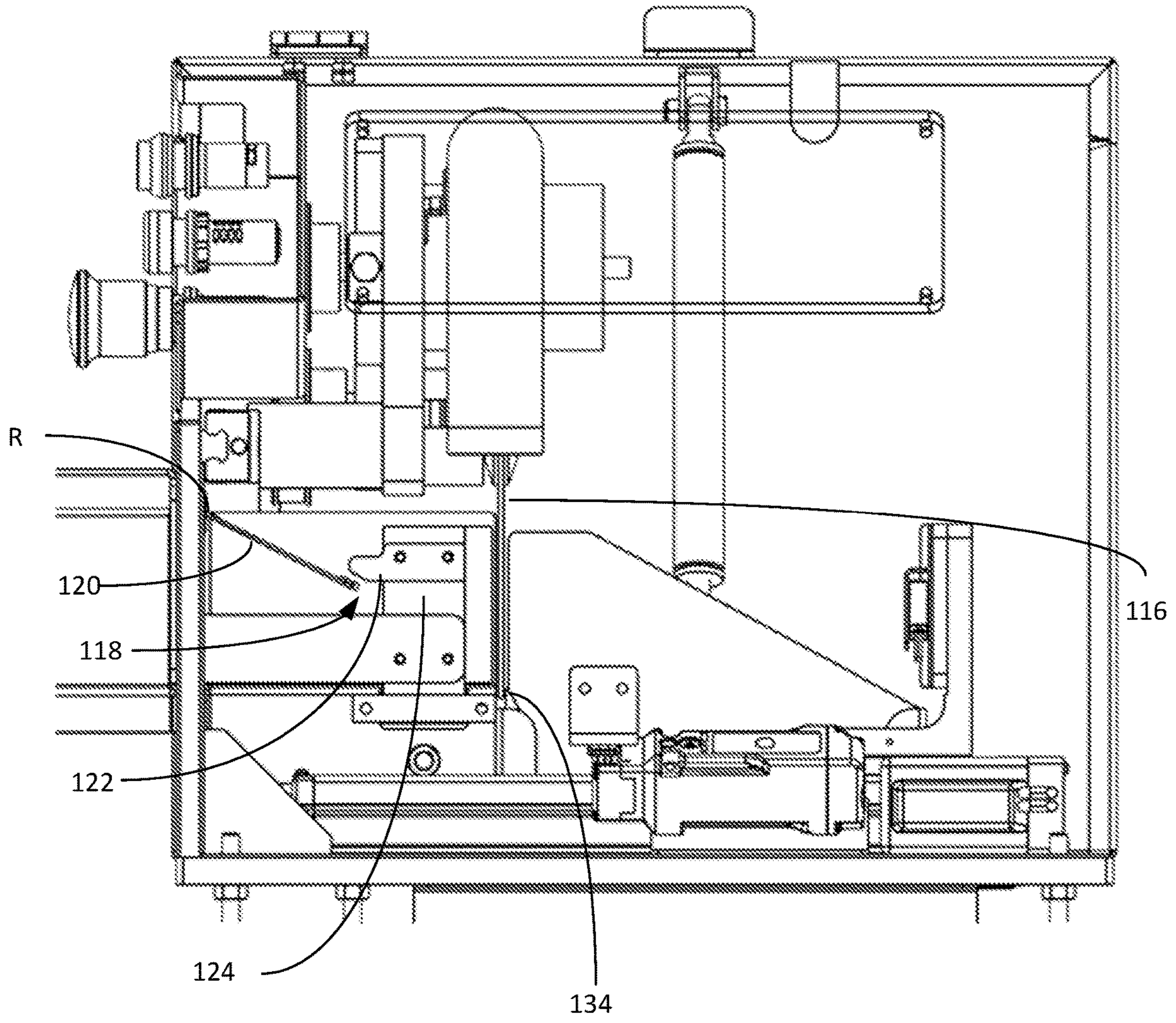
FIG. 2 shows the cutting assembly of FIG. 1, according to some embodiments.

FIG. 2 shows the cutting assembly 110 of FIG. 1, according to some embodiments. In FIG. 2, a portion of the housing 114 is removed so that the various components of the cutting assembly 110 are visible.

The cutting assembly 110 can include a cutting blade 116 and a safety latch assembly 118. In some embodiments, the safety latch assembly 118 is offset from the cutting blade 116 so that the cutting blade 116 does not collide with the safety latch assembly 118 during a cutting operation. As illustrated, the offset of the safety latch assembly 118 is in a horizontal direction with respect to the page.

In some embodiments, the safety latch assembly 118 can include a first member 120 and a second member 122. The second member 122 can be secured to a third member 124. In some embodiments, the first member 120 can be referred to as a gate, the second member 122 can be referred to as a latch, and the third member 124 can be referred to as a mounting block for the second member 122.

In some embodiments, the first member 120 is rotatable about a location R so that the first member 120 can move based on a height of the window blind being cut. This is because the window blinds of different materials may have different sizes. In some embodiments, the window blinds (even with similar materials) may have different sizes for which the first member 120 can account. In operation, the first member 120 and the second member 122 can secure the window blind during a cutting operation. In some embodiments, the second member 122 can prevent the first member 120 from over rotation.

In some embodiments, the blind cutting machine 100 includes a guide 134. The guide 134 can alternatively be referred to as a fall guide, a waste guide, a diverter, or the like. The guide 134 can be, for example, a piece of angled material placed and configured adjacent to the cutting blade 116 to guide the cutoff material from the blinds being cut into a waste collection basket or waste collection area. In some embodiments, the guide 134 can extend downwardly from the area adjacent the cutting blade 116, with the cutoff material being guided from the cutting blade 116 downward to a waste collection basket or waste collection area that is vertically lower (e.g., closer to a floor on which the blind cutting machine 100 is placed) than the cutting blade 116 and the guide 134.

In some embodiments, the guide 134 can have a triangular prism shape. In some embodiments, the guide 134 can be an angled piece of material that is bent and connected to the blind cutting machine 100 at a location adjacent to the cutting blade 116. In some embodiments, the location of the guide 134 dictates whether the guide 134 will successfully guide cutoff material into the waste collection basket or waste collection area. For example, in some embodiments, if the guide 134 is spaced from the cutting blade 116, the cutoff material will be ejected from the cutting blade 116 without being directed to the waste collection basket or waste collection area. In some embodiments, the gap between the guide 134 and the cutting blade 116 is minimized to be as small as possible without the guide 134 interfering with rotation of the cutting blade 116.

Figure 3:
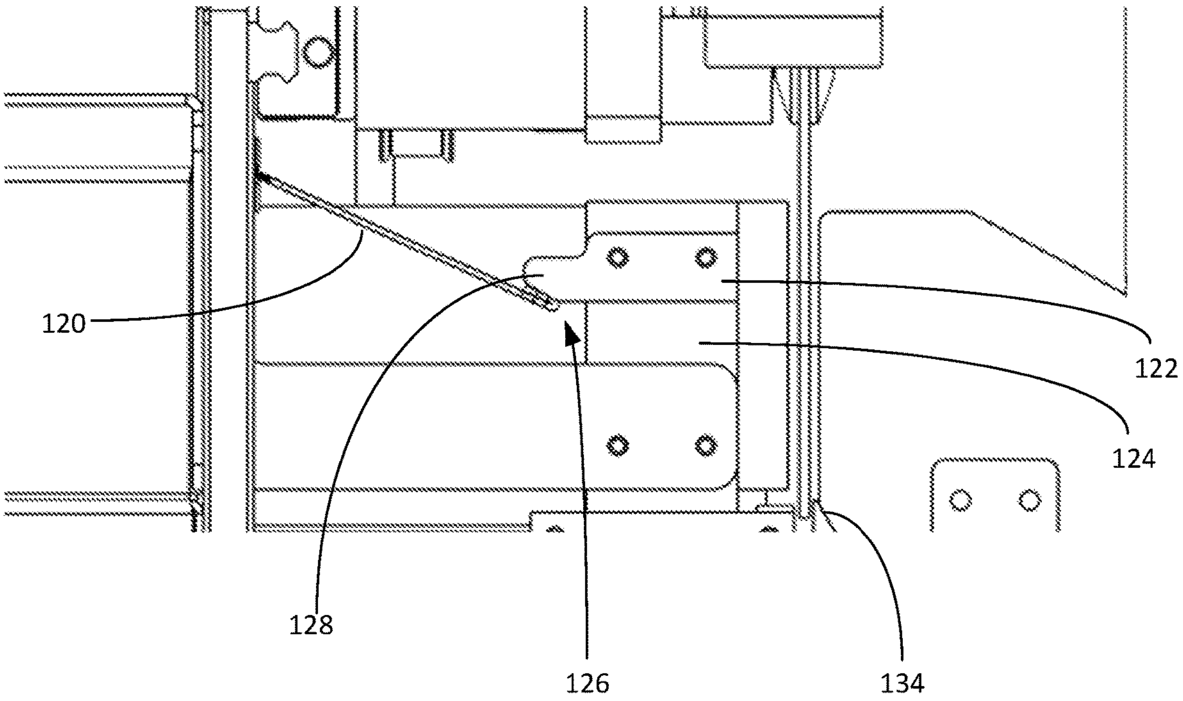
FIG. 3 shows a partial view of the cutting assembly of FIG. 1, according to some embodiments.

FIG. 3 shows a partial view of the cutting assembly 110 of FIG. 1, according to some embodiments. In the illustrated embodiment, the first member 120 is in a position in which it is engaged with the second member 122. This can be referred to as a cutting position or a cutting state, according to some embodiments. Although not shown, it is to be appreciated that in the illustrated configuration, a window blind may be loaded into the blind cutting machine 100 for cutting. In the cutting state, the first member 120 can prevent an operator or other individual from placing their hand (or other body part), clothing, or other object in a cutting area of the blind cutting machine 100. In some embodiments, the first member 120 can additionally hold the window blind in place for the cutting operation.

In the illustrated embodiment, the first member 120 abuts the second member 122, as is shown at location 126. A portion 128 of the second member 122 extends over the first member 120 at location 126. In some embodiments, the first member 120 can hold the window blind to prevent vertical movement caused by the cutting process. In some embodiments, this can be a configuration in which the blind cutting machine 100 is configured to cut a window blind having less depth such as a faux wood, cellular, roller shade, or other type of window covering.

Figure 4:
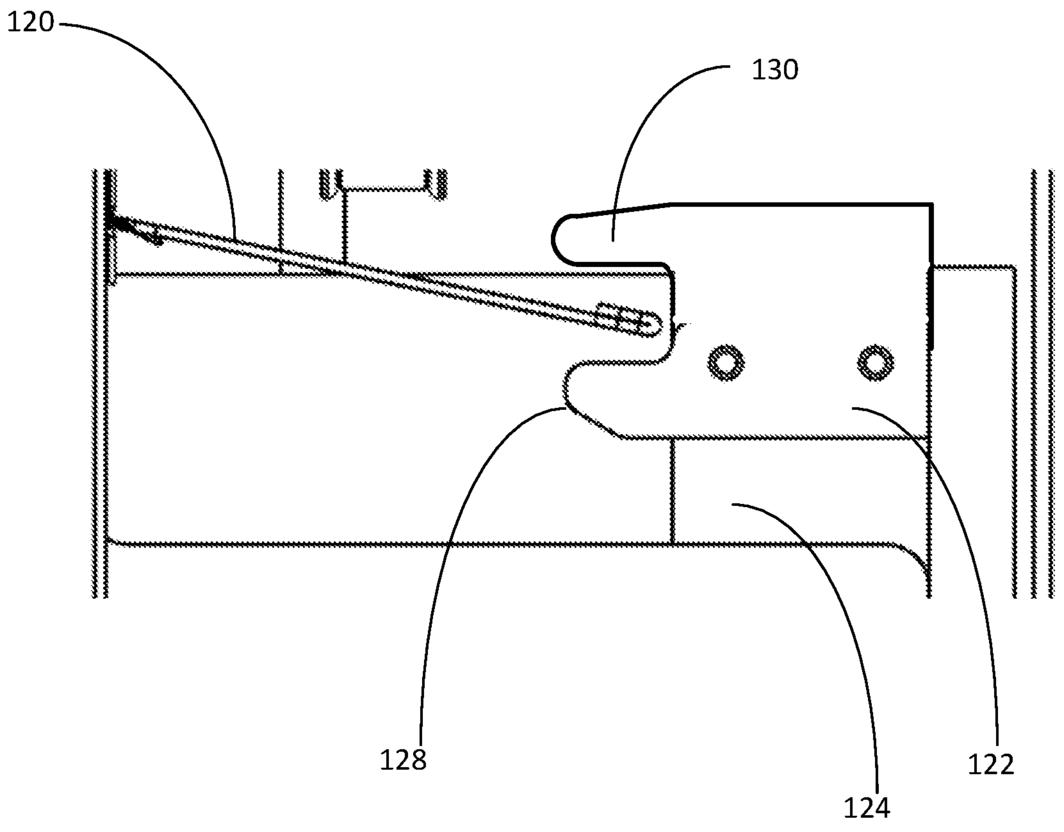
FIG. 4 shows a partial view of the cutting assembly of FIG. 1, according to some embodiments.

FIG. 4 shows a partial view of the cutting assembly 110 of FIG. 1, according to some embodiments. In the illustrated embodiment, the first member 120 is in a position in which it is engaged with a fourth member 130. This can be referred to as a cutting position or a cutting state, according to some embodiments. In the illustrated embodiment, the first member 120 is rotated beyond the portion 128 because a size of the window blind being cut is larger such that the second member 122 does not prevent the first member 120 from further rotation. Instead, for window blinds of this size (i.e., larger than the window blinds being cut in FIG. 3), the first member 120 is prevented from further rotation by the fourth member 130. In some embodiments, this can be a configuration in which the blind cutting machine 100 is used to cut a faux wood window blind.

Figure 5:
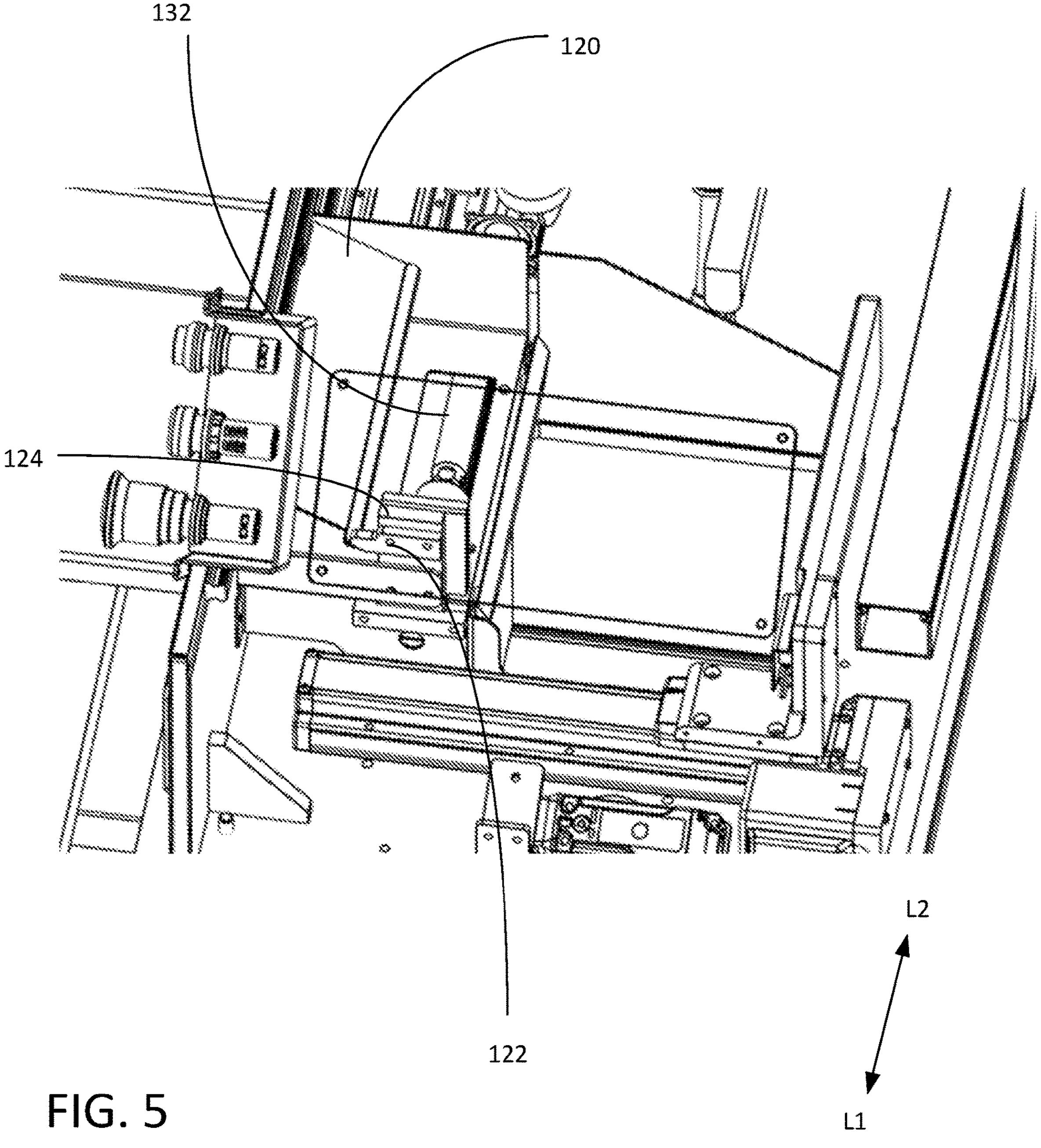
FIG. 5 shows an elevated perspective view of the cutting assembly of FIG. 1, according to some embodiments.

FIG. 5 shows an elevated perspective view of the cutting assembly 110 of FIG. 1, according to some embodiments. Additionally visible in FIG. 5 is an actuator 132. In some embodiments, the actuator 132 is a linear actuator. In some embodiments, the actuator 132 is configured to move the third member 124 in a direction along the line L1-L2. The actuator 132 can move the second member 122 to a location so that the first member 120 is not limited in its rotation by the second member 122, but instead is limited by the fourth member 130 (FIG. 4). As a result, the actuator 132 can control a limitation of the first member 120 according to an expected window blind size, which can be input into the display screen 106. In some embodiments, the actuator 132 may not be included. Instead, an operator may be able to move a linear member in place of the actuator 132 and the cutting assembly 110 can include a clamp for the operator to maintain the third member 124 in place instead of the actuator 132 so that an operator can manually operate and adjust the blind cutting machine 100.

Referring collectively to FIGS. 2-5, the first member 120 and corresponding limitations in rotation via the second member 122 or the fourth member 130 prevent a hand from being inserted into the cutting assembly 110 during a cutting operation.

Figure 6:
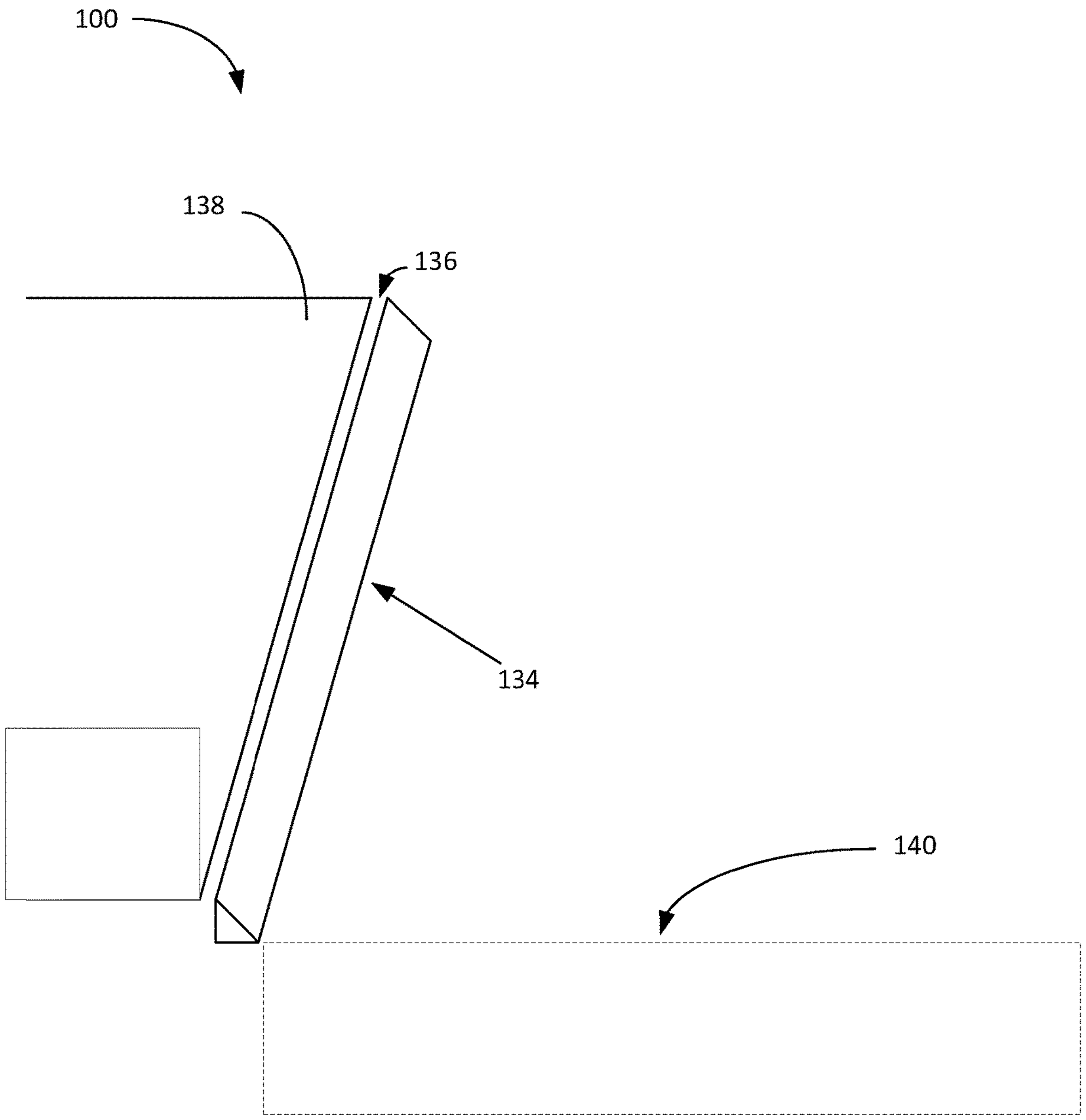
FIG. 6 shows a perspective view of the blind cutting machine of FIG. 1, according to some embodiments.

FIG. 6 shows a perspective view of the blind cutting machine 100 of FIG. 1, according to some embodiments.

As illustrated, the guide 134 is adjacent to the cutting blade 116 (not shown in FIG. 6). A space 136 is shown between a base 138 of the blind cutting machine 100 and the guide 134. In some embodiments, the space 136 is sized to accommodate the cutting blade 116 during a cutting operation.

In some embodiments, the blind cutting machine 100 includes a guide 134. The guide 134 can alternatively be referred to as a fall guide, a waste guide, a diverter, or the like. The guide 134 can be, for example, a piece of angled material placed and configured adjacent to the cutting blade 116 to guide the cutoff material from the blinds being cut into a waste collection area 140. In some embodiments, a waste collection basket can be disposed within the waste collection basket or waste collection area 140. In some embodiments, the guide 134 can extend downwardly from the area adjacent the cutting blade 116, with the cutoff material being guided from the cutting blade 116 downward to a waste collection basket or waste collection area 140 that is vertically lower (e.g., closer to a floor on which the blind cutting machine 100 is placed) than the cutting blade 116 and the guide 134.

In some embodiments, the guide 134 can have a triangular prism shape. In some embodiments, the guide 134 can be an angled piece of material that is bent and connected to the blind cutting machine 100 at a location adjacent to the cutting blade 116. It is to be appreciated that these shapes are examples. For example, in some embodiments, a planar piece of material can be used as the guide 134. In some embodiments, the planar piece of material can be bent to provide a curvature to the guide 134. In some embodiments, the location of the guide 134 dictates whether the guide 134 will successfully guide cutoff material into the waste collection basket or waste collection area 140. For example, in some embodiments, if the guide 134 is spaced from the cutting blade 116, the cutoff material will be ejected from the cutting blade 116 without being directed to the waste collection basket or waste collection area 140. In some embodiments, the gap between the guide 134 and the cutting blade 116 is minimized to be as small as possible without the guide 134 interfering with rotation of the cutting blade 116. In some embodiments, the guide 134 can have a thin edge that abuts the cutting blade 116. In some embodiments, a thick edge can prevent the guide 134 from directing the scraps into the waste collection basket or waste collection area. In some embodiments, a thickness of the guide 134 can be variable so that the edge is thin, but away from the edge the guide 134 can have a thickness that is greater than at the edge.

Figure 7:
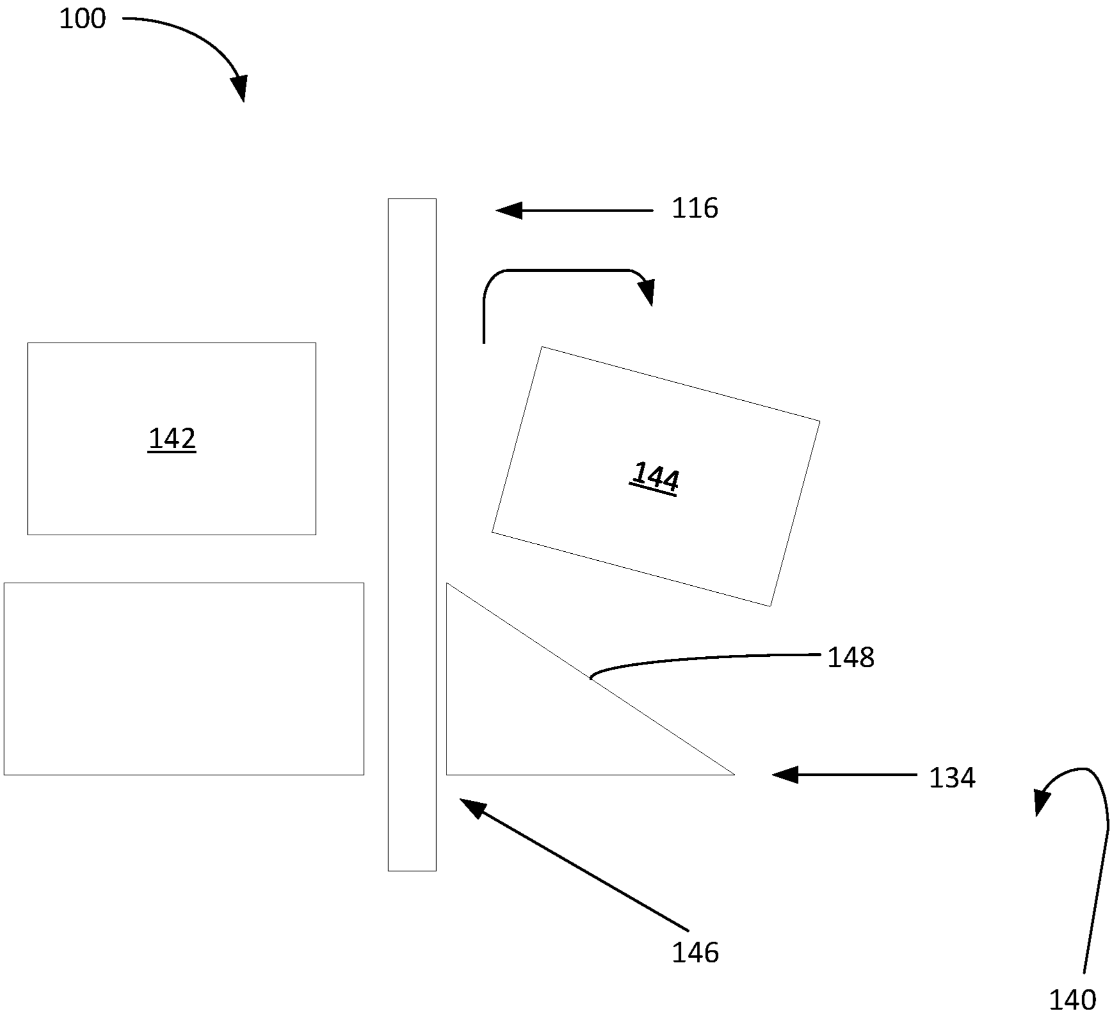
FIG. 7 shows a side schematic view of a blind cutting machine, according to some embodiments.

FIG. 7 shows a side schematic view of the blind cutting machine 100, according to some embodiments. It is to be appreciated that the blind cutting machine 100 includes one or more features besides what is illustrated in FIG. 7. However, these features have been removed for simplicity of the schematic representation of the blind cutting machine 100.

In the illustrated embodiment, the blind cutting machine 100 is shown along with a blind including blind portion 142 and cutoff material portion 144. The cutoff material portion 144 is being illustrated as being directed into the waste collection basket or waste collection area 140.

In the illustrated embodiment, the space 136 is shown between the base 138 and the guide 134. The cutting blade 116 is shown in a cutting position. As visible, a space 146 between the cutting blade 116 and the guide 134 is minimized. As a result, the schematic drawing shows the cutting blade 116 and the guide 134 nearly touching. It is to be appreciated that the placement of the guide 134 is selected so that the guide 134 does not rub or otherwise contact the cutting blade 116.

As illustrated, the guide 134 can be a triangular prism. In some embodiments, the guide 134 can be a piece of material that is bent into a triangular shape (but not include all sides of a triangular prism). In some embodiments, a slope of guide surface 148 can be determined to ensure that cutoff material portion 144 is guided into the waste collection basket or waste collection area 140. In some embodiments, if the slope is too steep, the guide 134 may not reduce the amount of cutoff material portion 144 that can be ejected from the cutting blade 116. In some embodiments, a slope that is too gradual may interfere with the waste collection basket or waste collection area 140 or may not reduce the amount of cutoff material portion 144 ejected from the cutting blade 116.

In some embodiments, a length dimension (i.e., into the page in the figure) of the guide 134 can be the same as or similar to a length dimension of the base 138. In some embodiments, the length dimension of the guide 134 can be smaller than the length dimension of the base 138, as long as the guide 134 has a length dimension that is at least covers an area over which the cutting blade 116 will be located when in the cutting position so that cutoff material portion 144 is directed by the guide 134 into the waste collection basket or waste collection area 140.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or any combination(s) thereof.

What is claimed is:

1. A blind cutting machine, comprising:
a cutting blade;
a base disposed on a first side of the cutting blade;
a guide disposed on a second side of the cutting blade;
wherein the first side is opposite the second side;
wherein the guide is adjacent to the cutting blade;
wherein the guide is configured to direct cutoff material to a waste collection area; and
an assembly, comprising:
a first member,
a second member,
wherein the first member is rotatable with respect to the second member, the second member is configured to limit an amount of rotation of the first member, and the first member and the second member secure a blind during a cutting operation; and an actuator, wherein the actuator is configured to move the second member to a location wherein the second member does not limit the amount of rotation of the first member;

wherein the first member is sized, shaped, and positioned to prevent a hand of an operator from coming into contact with the cutting blade.

2. The blind cutting machine of claim 1, wherein the guide is triangular in geometry.

3. The blind cutting machine of claim 1, wherein the guide is a triangular prism in geometry.

4. The blind cutting machine of claim 1, wherein the assembly comprises a third member, wherein the third member is secured to the actuator, and wherein the second member is secured to the third member.

5. The blind cutting machine of claim 1, wherein the assembly comprises a fourth member, wherein the fourth member is configured to limit the amount of rotation of the first member.

6. The blind cutting machine of claim 5, wherein the fourth member permits a larger amount of rotation of the first member than does the second member.

7. The blind cutting machine of claim 1, wherein in a first state, the second member is configured to not limit the amount of rotation of the first member.

8. The blind cutting machine of claim 1, further comprising a display device.

9. The blind cutting machine of claim 1, further comprising a housing, wherein the cutting blade and the assembly are disposed within an interior of the housing.

10. The blind cutting machine of claim 1, wherein the cutting blade is configured to cut window blinds of different types and sizes.

11. A blind cutting machine, comprising:

a frame;

a housing;

a cutting blade;

a base disposed on a first side of the cutting blade;

a guide disposed on a second side of the cutting blade;

wherein the first side is opposite the second side;

wherein the guide is adjacent to the cutting blade;

wherein the guide is configured to direct cutoff material to a waste collection area; and a cutting assembly disposed within the housing, wherein the cutting assembly comprises:

the cutting blade; and an assembly, comprising:

a first member, a second member, wherein the first member is rotatable with respect to the second member, the second member is configured to limit an amount of rotation of the first member, and the first member and the second member secure a blind during a cutting operation; and an actuator, wherein the actuator is configured to move the second member to a location wherein the second member does not limit the amount of rotation of the first member;

wherein the first member is sized, shaped, and positioned to prevent a hand of an operator from coming into contact with the cutting blade.

12. The blind cutting machine of claim 11, further comprising a display device.

13. The blind cutting machine of claim 11, further comprising a waste bin in the waste collection area.

14. The blind cutting machine of claim 11, wherein in a first state, the second member is configured to not limit the amount of rotation of the first member.

15. The blind cutting machine of claim 11, wherein the cutting blade is configured to cut window blinds of different types and sizes.

16. The blind cutting machine of claim 11, wherein the guide is triangular in geometry.

17. The blind cutting machine of claim 11, wherein the guide is a triangular prism in geometry.

18. The blind cutting machine of claim 11, wherein the waste collection area is vertically lower than the guide compared to a surface on which the blind cutting machine is located.

* * * * *